United States Patent [19]
Ehling et al.

[11] Patent Number: 5,103,573
[45] Date of Patent: Apr. 14, 1992

[54] PICTURE HANGING DEVICE

[75] Inventors: Peter Ehling, Cave Creek, Ariz.; Rolf E. Gruller, 26 W. Erie, Tempe, Ariz. 85282

[73] Assignee: Rolf E. Gruller, Tempe, Ariz.

[21] Appl. No.: 705,946

[22] Filed: May 28, 1991

[51] Int. Cl.⁵ .................... A47G 1/20; G01B 3/02
[52] U.S. Cl. ........................ 33/613; 33/379; 33/451
[58] Field of Search .............. 33/613, 451, 379, 365, 33/483, 485, 492, 413; 248/498, 542, 544, 546, 547

[56]  References Cited
U.S. PATENT DOCUMENTS

| | | | |
|---|---|---|---|
| 577,708 | 2/1897 | Barrie | 33/413 X |
| 2,816,366 | 12/1957 | Barlow | 33/180 |
| 2,965,339 | 12/1960 | Denton | 248/28 |
| 3,266,761 | 8/1966 | Walton et al. | 248/71 |
| 3,530,591 | 9/1970 | Moffitt | 33/180 |
| 4,220,309 | 9/1980 | Eisen et al. | 248/542 |
| 4,241,510 | 12/1980 | Radecki | 33/180 R |
| 4,443,949 | 4/1984 | Newton | 33/180 R |
| 4,455,756 | 6/1984 | Greene | 33/180 R |
| 4,883,247 | 11/1989 | Crandall | 248/542 |

Primary Examiner—Harry N. Haroian
Attorney, Agent, or Firm—Charles E. Cates; Frank T. Barber

[57]  ABSTRACT

A device for hanging pictures and the like including a flat elongated ruler-like body adapted to be held in a generally horizontal position on a wall. The device has a centering means, such as a notch, at its midpoint and calibrated indicia extending outwardly longitudinally from the centering point. Conventional picture hooks are frictionally engaged at predetermined points along the upper edge of the device by a rod which is attached to the device parallel to and spaced apart form the upper edge. In using the device, a single mark is made on the wall to indicate the height and lateral position of the picture, and then the device is held with one hand in a horizontal position, with the centering notch registering with the mark on the wall, while the picture hooks are nailed into place with the other hand.

14 Claims, 1 Drawing Sheet

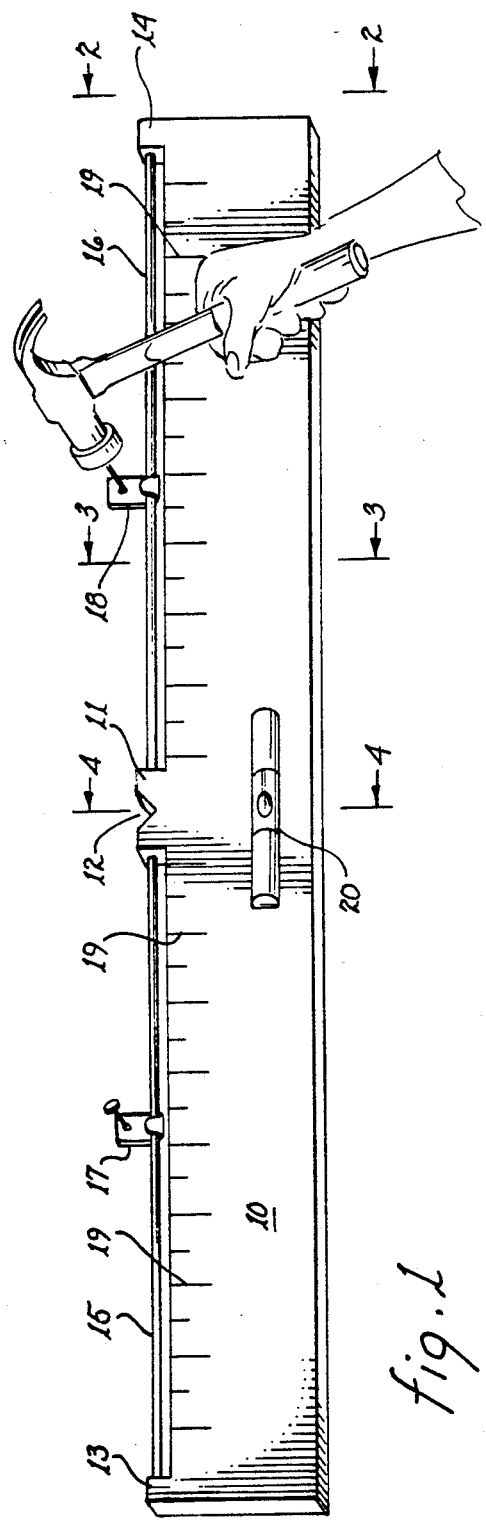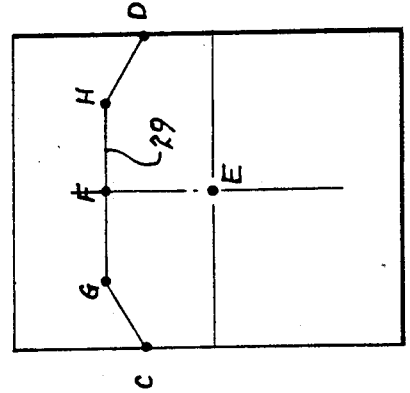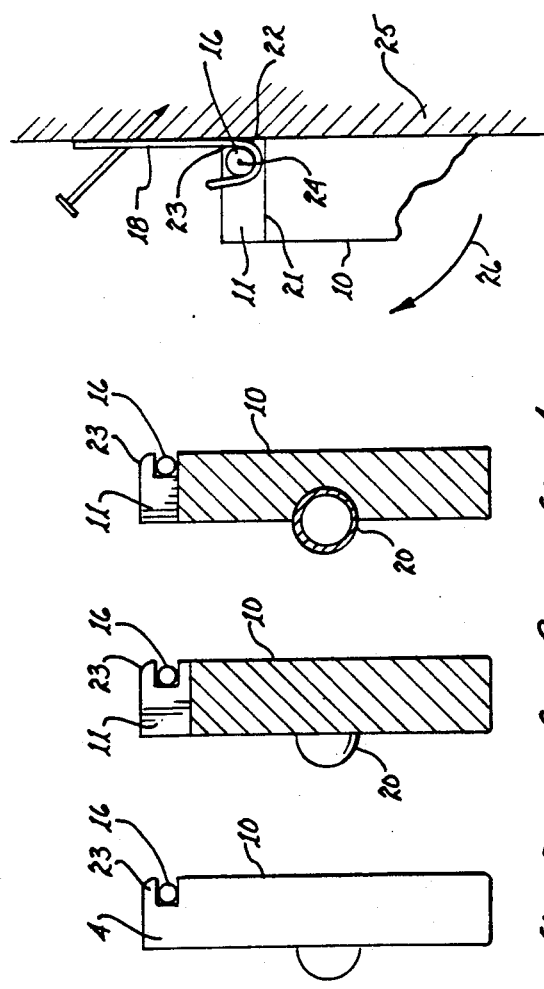

PICTURE HANGING DEVICE

BACKGROUND OF THE INVENTION

The present invention relates to a device for use in hanging wall-supported objects, such as pictures, mirrors, paintings, and the like. More particularly, the invention relates to a device for hanging such objects quickly, efficiently, and in a level orientation.

Numerous picture hanging aids or devices are known in the art. A common technique involves attaching an eye screw or hook into the back of the picture frame, near the top center, and hanging this hook over a nail driven into the wall. The disadvantage of this approach is that it requires an extremely careful measurement to locate the screw or hook on the vertical center line of the picture, or otherwise the picture will hang off-level. Further, the use of a single suspension point permits shifting of the picture to an off-level position when any vibration occurs.

An improved approach involves fastening eyes or hooks on both sides of the back of the picture frame and stretching a support wire between them. The picture can then be supported by engaging the wire on two or more hooks fastened to the wall at properly spaced apart positions. However, this approach requires a number of precise measurements to determine the appropriate level position for the hooks on the frame and the hangers on the wall. These measurements can be a particularly tedious and time consuming task in homes or institutions having a large number of pictures requiring accurate levelings. The alternative to making the tedious measurements is the trial and error method which usually becomes just as time consuming and tedious.

It is an object of the present invention to provide a picture or mirror hanging aid that removes the tediousness and/or the trial and error frustration in determining the proper and exact location of the points at which the picture or mirror hanging hooks are to be fastened to the wall.

Another object of the invention is to provide a hanging device that can be used by any person for hanging a picture or mirror on a wall regardless of that person's lack of experience in this art.

A further object is to provide a hanging device that enables fastening of the hanger hooks to the wall based on a single centering point, without the need to mark additional points or lines on the wall.

Additional objects and advantages of the invention will appear as the specification proceeds and the accompanying drawings are examined.

SUMMARY OF THE INVENTION

This invention relates to a device for determining the location of hangers for a picture or similar type wall supported member. The device includes as its basic member a generally flat elongated body, such as a large ruler, which is adapted to be held in a generally horizontal position against a wall. The elongated body contains a centering means, such as a notch, for positioning the elongated body on the wall at a predetermined centering point for the picture. It also contains calibrated indicia extending longitudinally outwardly from the centering means, and, further, it includes means for frictionally engaging hanging devices at its upper edge for sliding the hanging devices to predetermined points along the upper edge. Use of the device enables pairs of hanging devices to be temporarily positioned by friction on the upper edge of the ruler-like body at points substantially equidistant from the notch or other centering means until the hanging devices can be fastened to the wall.

In a preferred embodiment, a leveling device is mounted on the ruler-like body to assist in leveling the horizontal position of the body when it is held against the wall. Also, in the preferred embodiment, wherein the hangers are conventional picture-hanging clips having a wire-engaging hook and a nail hole, the nail hole is filled with glue or other pierceable solid which can temporarily hold the nail in a pre-set position until it is driven into the wall.

It is a feature of the invention that, in use, it is necessary only to mark a centering point on the wall, frictionally engage a pair of hangers in calibrated predetermined positions along the upper edge of the ruler-like body, place the ruler body on the wall in a level position with its centering notch registering with the marked center point, and then, while holding the ruler in this position with one hand, drive the pre-set nails into the wall to fasten the hangers with the other hand.

BRIEF DESCRIPTION OF THE DRAWINGS

The details of the invention will be described in conjunction with the accompanying drawings, in which:

FIG. 1 is a perspective view of the inventive device, showing its position against a wall during use.

FIG. 2 is an enlarged end view of the device shown in FIG. 1.

FIG. 3 is a cross-sectional view, taken along line A—A' in FIG. 1.

FIG. 4 is a cross-sectional view, taken along line B—B' in FIG. 1.

FIG. 5 is an enlarged cross-sectional view showing the means for frictionally engaging the hanger hooks to the upper edge of the ruler-like body.

FIG. 6 is a diagrammatic view of the back side of a picture which is to be hung.

DETAILED DESCRIPTION OF THE INVENTION

Referring to the drawings, the basic element of the invention is a generally flat elongated, ruler-like body 10, which may be made of wood, metal, plastic or other suitable substantially rigid material. As will be seen in FIG. 1, the ruler 10 is suitable for holding in a generally horizontal position against a wall.

The ruler 10 has a center post 11 mounted on its upper edge, and the center post includes a V-shaped notch 12 positioned with the apex of the V at the central point of the ruler 10. End posts 13 and 14 are also mounted on the upper edge of the ruler 10 in the positions shown in FIG. 1. The end posts may be separate units attached to the ruler 10 or may be formed as integral parts of the ruler. A rod 15 is mounted with one end in the end post 13 and the other end in the center post 11, and a rod 16 is mounted with one end in the center post 11 and the other end in the end post 14. Rods 15 and 16 are mounted in a position generally parallel to the longitudinal axis of the ruler 10 and spaced apart from its top edge, to provide a frictional fit for the hook portions of the picture hangers 17 and 18 as shown in FIG. 1 and to be described in greater detail hereinafter.

Calibrated indicia lines 19 extend longitudinally outwardly from the V of the notch 12 on both sides thereof, to assist in locating the picture hangers 17 and 18 at equidistant points from the center notch 12. Numerical indicia (not shown) may be included if desired. A leveling device 20, such as a bubble or cats-eye, is mounted on the ruler 10 to assist in horizontal leveling of the ruler.

It is a feature of the invention that the rods 15 and 16 be spaced apart from the top edge of the ruler 10 at an appropriate distance to maintain a close frictional fit for holding the picture hangers 17 and 18 at desired positions equidistant from the center notch 12. As shown in FIG. 5, the rod 16 is located above the top edge 21 of ruler 10 to provide a good friction fit for the hook portion 22 of the hanger 18. It is important that the rods 15 and 16 be made of a strong material, such as metal, wood, plastic, and the like, which is flexible enough to permit insertion of the hook portion 22 between the rod and the upper edge of the ruler, but at the same time rigid enough to maintain the frictional engagement during use.

It is also a feature of the invention that the rear top edge of the device which bears against the wall is rounded, so that, after the hangers 17 and 18 are nailed to the wall, the bottom of the ruler 10 may be rotated outwardly and then lifted upwardly to disengage the hook portion 22 of the hangers from the friction fit between the rods 15 and 16 and the ruler 10. As shown best in FIG. 5, the edge 23 should be rounded, with the rounding following the arc of a circle whose center is close to the longitudinal axis 24 of the rod 16, so that, when the bottom of the ruler 10 is rotated away from the wall 25 in the direction shown by the arrow 26, the axis of rotation corresponds generally to the longitudinal axis 24 of rod 16. Such rotation does not cause the hook 22 to be urged away from its fastened position on the wall. If the edge 23 were not rounded, the axis of rotation would be at a higher point, and rotation of the ruler to disengage the hook 22 would cause a loosening or dislodging of the hook. It will be noted that the rounded edge may be on the center post 12 and the end posts 13 and 14 if they are separate parts, or the rounding may be on the inward upper edge of the ruler itself if the center and end posts are integral parts of the ruler.

In a preferred embodiment, the nail holes in the hangers 17 and 18 are filled with a pierceable solid material, such as glue, resin or the like, and the hangers are assembled with nails already inserted in the nail holes and held in place there by the pierceable solid material.

In operation of the device, the operator first uses the placement and tautness of the wire on the back of the picture to determine the height at which the hangers are to be fastened to the wall, and then makes a single mark on the wall at that height and at the lateral point desired. As the next step, a pair of picture hangers 17 and 18 are installed on the device by inserting their hooks 22 between the upper edge 21 of the device 10 and the rods 15 and 16, and are then adjusted by lateral movement to a predetermined distance on either side of the center notch 12. Following this, the device 10 is placed against the wall with the notch 12 registering with the mark which has been made on the wall, and is adjusted to a horizontal position by use of the leveling device 20. Finally, while the device is held in this position with one hand, the other hand is used to nail the hangers 17 and 18 to the wall. In this manner, by making a single mark on the wall, it is possible to install the hangers so that the picture may be hung at the desired height and in a level position.

As an illustrative example showing use of the invention, assume that the picture shown in FIG. 6 is to be hung on a wall with its vertical midpoint E positioned 60" above the floor. As shown, the picture is 48" high and 36" wide, and therefore the vertical midpoint E is 24" above the bottom of the picture. The picture has eye hooks which are screwed into the sides of the frame at points C and D, both of which are 32" above the bottom of the picture. A wire 29 is attached to the eye hooks at points C and D.

To use the device of the invention, the operator holds the wire taut by use of the fingers at points G and H, so that the wire assumes the position shown in FIG. 6. The operator then measures the distance between points E and F and adds this to 60". In this example, the distance E-F is 10", and therefore the operator makes a single mark on the wall 70" above the floor.

The distance between points G and H is then measured, in this case being 24". Hangers 17 and 18 are then inserted on the upper edge of the device 10 and adjusted laterally so that hanger 17 is 12" to the left of the center notch 12 and hanger 18 is 12" to the right.

Finally, the operator places the device 10 on the wall with the notch 12 registering with the 70" mark that was placed on the wall, and with horizontal leveling of device 10 confirmed by use of the leveling device 20. While holding device 10 in this position with one hand, the operator nails hangers 17 and 18 to the wall with the other, and then, with a rotating and lifting motion, removes the device 10, leaving the hangers 17 and 18 secured at the appropriate horizontal positions and spaced apart in the appropriate lateral positions. When the picture is hung on the hangers, it will be perfectly level, and its midpoint will be an accurate 60" above the floor.

While particular forms of the invention have been illustrated and described herein, it will also be understood that various modifications can be made without departing from the spirit and scope of the invention.

What is claimed is:

1. A device for determining the location of hangers for a picture or similar type wall supported member, said device comprising:
   a. a generally flat elongated body, adapted to be held in a generally horizontal position against a wall;
   b. centering means on said elongated body for positioning said elongated body on said wall at a predetermined centering point for said picture or other wall supported member;
   c. calibrated indicia on said elongated body, extending longitudinally outwardly from said centering means, on both sides thereof; and
   d. means for frictionally engaging hanging devices at the upper edge of said elongated body and for sliding said hanging devices to predetermined points along said upper edge, whereby pairs of hanging devices can be temporarily positioned on the upper edge of said elongated body at points substantially equidistant from said centering means until said hanging devices can be fastened to said wall.

2. A device as set forth in claim 1 wherein said centering means is a generally V-shaped notch located at the mid-point of the upper edge of said elongated body.

3. A device as set forth in claim 1 wherein level means are mounted on said elongated body.

4. A device as set forth in claim 1 wherein said hanging devices comprise picture-hanging clips having a wire-engaging hook and a nail hole.

5. A device as set forth in claim 4 wherein said nail hole is filled with a pierceable solid to temporarily hold a nail until nailed.

6. A device as set forth in claim 1 wherein the rear top edge of said elongated body which bears against said wall is rounded to permit the bottom of said elongated body to be rotated outwardly and upwardly to disengage said frictional engaging means from said hanging devices after said hanging devices have been attached to said wall.

7. A device for determining the location of hangers for a picture or similar type wall supported member, said device comprising:
   a. a ruler-like body, adapted to be held in a generally horizontal position against a wall;
   b. centering means on said ruler-like body for positioning said body on said wall at a predetermined centering point for said picture or other wall supported member;
   c. calibrated indicia on said ruler-like body, extending longitudinally outwardly from said centering means, on both sides thereof;
   d. a level indicator mounted on said ruler-like body; and
   e. a hanger-engaging rod attached along the upper edge of said ruler-like body, but spaced apart from said upper edge, for frictionally engaging hanging devices between said rod and the upper edge of said ruler-like body and for permitting sliding of said hanging devices to predetermined points along said upper edge, whereby pairs of hanging devices can be temporarily positioned on the upper edge of said ruler-like body at points substantially equidistant from said centering means until said hanging devices can be fastened to said wall.

8. A device as set forth in claim 7 wherein said centering means is a generally V-shaped notch located at the mid-point of the upper edge of said ruler-like body.

9. A device as set forth in claim 7 wherein said level indicator is a bubble level.

10. A device as set forth in claim 7 wherein said hanging devices comprise picture-hanging clips having a wire-engaging hook and a nail hole.

11. A device as set forth in claim 10 wherein said nail hole is filed with a pierceable solid to temporarily hold a nail until nailed.

12. A device as set forth in claim 7 wherein the rear top edge of said elongated body which bears against said wall is rounded to permit the bottom of said elongated body to be rotated outwardly and upwardly to disengage said frictional engaging means from said hanging devices after said hanging devices have been attached to said wall.

13. A device as set forth in claim 7 wherein said hanger-engaging rod is attached along the upper edge of said ruler-like body by end posts and supported at a midpoint by a center post.

14. A device as set forth in claim 13 wherein a V-shaped centering notch is in said center post.

* * * * *